July 30, 1957 H. ARROYO LOPEZ 2,801,404
WEIGHT-OF-PASSENGER OPERATED ELECTRICAL
SIGNAL SYSTEM FOR VEHICLES
Filed Dec. 22, 1954
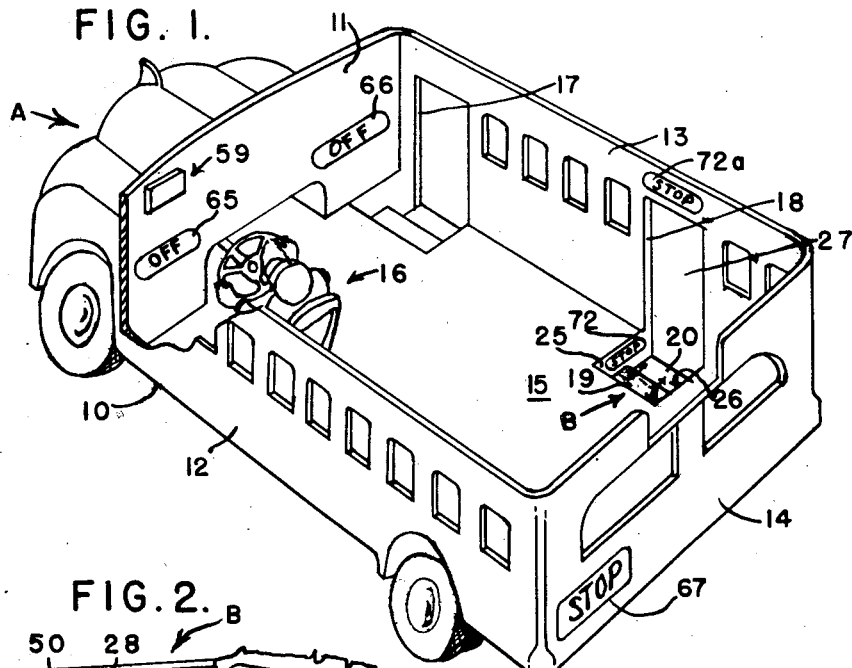
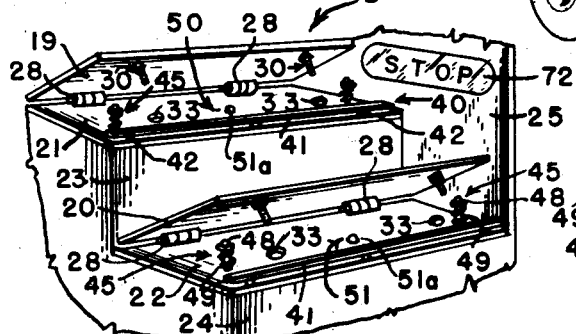
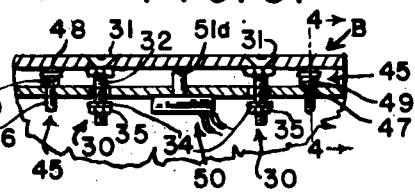
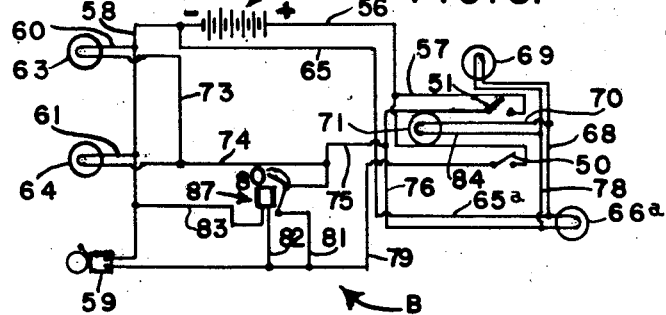
INVENTOR
Humberto Arroyo Lopez
BY *Lancaster, Allwine & Rommel*
ATTORNEYS

United States Patent Office 2,801,404
Patented July 30, 1957

2,801,404

WEIGHT-OF-PASSENGER OPERATED ELECTRICAL SIGNAL SYSTEM FOR VEHICLES

Humberto Arroyo Lopez, Mexico City, Mexico

Application December 22, 1954, Serial No. 477,040

1 Claim. (Cl. 340—48)

This invention relates to passenger-operated electric signal systems and more particularly to an electric signal system operated by the weight of a passenger of a vehicle just prior to the passenger's exit from the vehicle.

An important object of the invention is to provide a signal system as described, wherein the passenger descends two steps while leaving a vehicle and, during the time his weight is upon the uppermost step, there are visible signals and an audible signal, but the latter signal ceases upon descent of the passenger to the second step, although the visible signals continue until he has alighted from the vehicle. This eliminates a prolonged audible signal which is undesirable for a number of well-recognized reasons.

Another important object is to provide a plurality of visible signals disposed to notify both the driver of a vehicle that a passenger desires to leave the vehicle, as well as to warn drivers of vehicles behind the signalling vehicle that the vehicle is about to come to a stop to discharge a passenger. In addition, some of the signals also advise the passenger that the driver has been apprised of the desire of the passenger to alight and the vehicle will be brought to a stop by the driver at the next regular stop along the route.

A further important object is to provide a simple but effective signal system for the purposes mentioned. The system takes up but little room in a vehicle, does not impede exit from the vehicle and is quick-acting.

Other objects and advantages of the invention will be apparent during the course of the following detailed description of the invention, taken in connection with the accompanying drawing, forming a part of this disclosure, and in which drawing:

Fig. 1 is a perspective view of a vehicle, with parts broken away in order to better illustrate portions of the signal system which is installed in the vehicle.

Fig. 2 is a perspective view of a major portion of the signal system with portions moved out of their ordinary positions in order to reveal the parts beneath.

Fig. 3 is a vertical longitudinal section, substantially on the line 3—3 of Fig. 1.

Fig. 4 is a vertical transverse section, substantially on the line 4—4 of Fig. 3.

Fig. 5 is an electrical wiring diagram of the system.

In the drawing, wherein for the purpose of illustration is shown a preferred embodiment of the invention and wherein similar reference characters designate corresponding parts throughout the several views, the letter A designates a regular-stop vehicle adapted to traverse a route and the letter B the signalling means carried thereby.

The vehicle A, in the example shown, includes a wheeled vehicle body 10 with front wall 11, side walls 12 and 13, rear wall 14 and floor 15. A driver's station 16 is disposed adjacent the front wall 11 and generally near the side wall 12. The side wall 13 is provided with a forward entrance 17 and an exit 18 which latter is relatively near the rear wall 14 and remote from the driver's station 16. Leading from the floor 15 to the exit 18 are two movable steps or treads 19 and 20 superposed upon two fixed supports 21 and 22, with fixed risers 23 and 24. Two opposite panels 25 and 26 extend along the ends of the steps, supports and risers which, with the exit closure or door 27, define a well. In the example shown, the movable steps 19 and 20 are illustrated as pivoted at their rear sides by means of hinges 28 carried by the steps 19 and 20 and the adjacent portions of the supports so that, when horizontal, the steps are raised above or superposed over the associated supports 21 and 22 respectively. Figure 2 does not represent operative positions of the steps, but illustrates the steps raised so as to show more clearly the structure beneath them.

Each step 19 and 20 is limited in its upward movement by, preferably, a plurality of spaced-apart stop means 30, which may comprise nut and bolt assemblies with the heads 31 of the bolt being countersunk in the body of the respective steps and the shanks 32 projecting through suitable openings 33 in the supports 21 and 22 respectively. Nuts 34 and lock nuts 35 upon the end portions of the shanks tend to allow some movement to the steps but prevent them from rising so as to tilt undesirably.

Associated with each step is stop means 40 to limit downward movements of the steps and this means, for each step, may be an abutment rigidly carried at the forward portions of the upper faces of the supports, comprising an elongated strip 41 supported upon spacers 42.

Means 45 urging the steps upwardly after release from the weight of a passenger of the vehicle upon the step, preferably comprises a plurality of spaced-apart shanks 46 slidable through suitable spaced-apart openings 47 in the supports 21 and 22 and having heads or enlargements 48 upon their upper ends. Expansion helical springs 49 encircle the portions of the shanks above the supports and below the heads to urge the steps upwardly.

Carried by each support 21 and 22 is an electric switch 50 or 51 respectively, of the type wherein a button or projection 51a when depressed will close the switch and, when pressure is released, will open the switch. The buttons 51a slidably extend through suitable openings in the supports with the switch housings conventionally supported from the under sides of the supports.

Fig. 5 illustrates (diagrammatically) the electrical wiring of the new signal, with the source of electrical energy being, by way of example, a single source for all signals both visual and audible. This source may be a conventional secondary storage battery 55 with conductor 56 extending from one terminal of the battery to one pole of the switch 50 and lead 57 to one pole of the switch 51. From the other terminal of the battery 55 a conductor 58 extends to one terminal of an audible signal device 59, which is preferably a gong disposed upon the wall 11 adjacent the operator of the vehicle. Leads 60 and 61 from the conductor 58 extend to one terminal of two visual signals, which may be electric lamps 63 and 64 disposed in recesses in the wall 11 behind panels 65 and 66 of light rays-transmitting material such as glass, which may bear suitable indicia, such as "Off" and being visible to the operator of the vehicle. Another lead 65a extends to one terminal of an electric lamp 66a carried in a recess in the rear wall 14, preferably at the lower portion of the wall, behind a panel 67 of light rays transmitting material, as glass, bearing suitable indicia as "Stop" and adapted to warn those behind the vehicle D that the vehicle is about to stop and they, too, should stop. A lead 68 from the lead 65 extends to a terminal of an electric lamp 69 and a lead 70 from the lead 68 to a terminal of a second electric lamp 71. One of these lamps is disposed in a suitable recess in a panel 25 and the mouth of recess covered by a suitable panel 72 while the other lamp 71 is disposed in a recess in the wall 13 above the exit 18 and covered by a panel 72ª like the panel 72. The panels 72 and 72ª are, of course, of light rays-transmitting material, preferably contain the indicia "Stop" and are so disposed that they are visible to the passengers upon or descending the steps 19 and 20, whereby they will know, when the panels 72 and 72ª are illuminated, that the vehicle will stop at the next regular stop. From the other terminal of the lamp 63 a lead 73 extends to a lead 74 leading to the other terminal of the lamp 64, and the lead 74 is electrically connected with a lead 75 to lead 76 extending to the other terminal of the lamp 66ª and to the other pole of the switch 51. A lead 78 extends from the lead 76 to the other terminal of the lamp 69. From the other pole of the switch 50, a lead 79 extends to the other terminal of the gong 59. Lead 75 extends to a contact 80 for the armature of a relay 87, with a lead 81 extending from the armature to the lead 79. The wirings of the relay 87 are electrically connected by lead 82 to lead 79 and by lead 83 to lead 58. A lead 84 extends from the lead 78 to the other terminal of the lamp 71.

It will be observed that, as the passenger steps upon the uppermost step 19, his weight will depress the step and switch button 51ª beneath. This will close the switch 50 and cause energization of the lamps 63, 64, 66ª, 69 and 71 and ringing of the gong 59. When the passenger leaves step 19 and treads upon step 20, step 19 will ascend and the electric circuit will open, as the step 20 will be depressed, depressing the button 51ª of the electric switch 51 carried by the support 22 below step 20 and closing the switch. This will cause re-energization of the lamps 63, 64, 66ª, 69 and 71 but not of the gong 59. When the vehicle A comes to a stop and the operator opens the door 27, as is well known in the art, the passenger will leave the step 20 which will then rise and the switch will open. All lamps will then be extinguished and the operator knows his passenger has alighted, while those behind the vehicle will know it is then safe to pass the vehicle A. As has been heretofore stated, the gong 59 rings only when step 19 is depressed.

Various changes may be made to the form of the invention herein shown and described without departing from the spirit of the invention or scope of the claim.

What is claimed is:

In combination with a regular stop vehicle having a driver's station, a rear exterior wall, two fixed steps normally for treading upon by a passenger desiring to alight, and vertically-disposed fixed panels at the ends of said fixed steps, means, actuated by the weight of the passenger, for simultaneously visually and audibly signalling the driver of the vehicle upon the passenger descending to the upper step and only visually signalling the driver upon the passenger subsequently descending to the lower step, comprising movable steps, the first superposed upon the upper fixed step and the second superposed upon the lower fixed step, each movable step being provided with means to limit its upward movement from the fixed step over which it is superposed, comprising a rigid shank depending from each movable step, each fixed step being provided with an opening to slidably accommodate a rigid shank extending therethrough and projecting outwardly therefrom, and adjustable stop means upon each shank disposed below the fixed step through which the shank projects, each movable step being provided with means to limit downward movement thereof, comprising abutments rigidly carried at the forward portions of the upper faces of the fixed steps, means urging the movable steps upwardly after release from the weight of a passenger of the vehicle upon the movable steps, comprising a rigid shank depending from each movable step, each fixed step being provided with an opening to slidably accommodate each last-named shank and an expansion helical spring about each last-named shank disposed in the spaces between each fixed step and the movable step superposed thereover, electric switch means carried by each fixed step, including a switch housing carried upon the underside of each fixed step, and an off-on switch actuator, each fixed step being provided with an opening through which a switch actuator projects and extends upwardly therefrom and disposed in the path of movement of but normally out of contact with the movable step superposed thereover, an electric circuit with the electric switch carried by the upper step interposed therein, an electrically operated audible signal device interposed in said circuit, a plurality of electrically-operated visual signals interposed in said circuit, one being disposed at said driver's station one being carried by one of said panels and one being carried by said rear exterior wall, and electric means from the electric switch carried by the lower fixed step to said circuit whereby said visual signals only will be energized when the passenger treads upon the lower movable step.

References Cited in the file of this patent

UNITED STATES PATENTS

| | | |
|---|---|---|
| 906,166 | Schweizer | Dec. 8, 1908 |
| 1,300,318 | Winter | Apr. 15, 1919 |
| 1,598,850 | Collette | Sept. 7, 1926 |